United States Patent [19]

Shimura et al.

[11] 4,422,895
[45] Dec. 27, 1983

[54] METHOD OF PRODUCING A COMPRESSIBLE LAYER AND A BLANKET FOR PRINTING OPERATION

[75] Inventors: Haruo Shimura; Takao Kawata, both of Saitama, Japan

[73] Assignee: Fujikura Rubber Ltd., Tokyo, Japan

[21] Appl. No.: 515,310

[22] Filed: Jul. 18, 1983

[30] Foreign Application Priority Data

Jul. 16, 1982 [JP] Japan .............................. 57-122831
Jul. 16, 1982 [JP] Japan .............................. 57-122832
Jul. 16, 1982 [JP] Japan .............................. 57-122833

[51] Int. Cl.³ ................... B32B 5/18; B32B 31/14; B44C 1/22; C03C 15/00
[52] U.S. Cl. ........................... 156/633; 156/639; 156/655; 156/668; 156/77; 156/155; 427/352; 428/308.4; 428/909
[58] Field of Search ........... 156/629, 630, 632, 633, 156/637, 639, 644, 655, 668, 77, 155; 427/230, 243, 244, 245, 271, 288, 352, 353, 373; 428/158, 304.4, 308.4, 909; 101/368, 1

[56] References Cited

U.S. PATENT DOCUMENTS 2,500,573  3/1950  Rockoff ....................... 156/77
2,983,960  5/1961  Jilge ........................... 156/77 X
3,486,968  12/1969  Mater et al. ................. 156/77 X
4,110,153  8/1978  Rechlicz ...................... 156/655 X Primary Examiner—William A. Powell
Attorney, Agent, or Firm—Koda and Androlia

[57] ABSTRACT

An improved method of producing a compressible layer to be utilized for a blanket for printing operation is disclosed, wherein the improvements are that the method comprises the steps of adding to elastomer compound of oil resistant polymer pulverized material which is dissolvable in effluent, placing the elastomer compound over a base fabric in the form of a layered structure, and subjecting to vulcanization and then immersing it in the effluent at a predetermined temperature for a certain period of time. To improve compressibility one or more another compressible layers are preferably placed over the early prepared compressible layer with adhesive agent interposed therebetween so as to form an integrated structure. In addition, a method of producing a compressible blanket for printing operation is also disclosed according to another aspect to the invention, wherein after completion of producing the compressible layer, it is coated with adhesive agent at a predetermined rate of coverage in such a manner as to allow it to penetrate into a number of voids in the compressible layer and a reinforcing material is then placed over the compressible layer so as to adhesively integrate each other.

30 Claims, 2 Drawing Figures

METHOD OF PRODUCING A COMPRESSIBLE LAYER AND A BLANKET FOR PRINTING OPERATION

BACKGROUND OF THE INVENTION

1. Field of the Invention

The present invention relates to a method of producing a compressible layer to be utilized for a blanket for printing operation as well as a method of producing a blanket for printing operation with such compressible layer.

2. Prior Art

As is widely known, a blanket in use for printing operation such as high speed offset printing or the like is often provided with a compressible layer made of polymer having a certain elasticity. Firstly, this compressible layer is intended to uniformly absorb the expansion caused on the compression surface of the blanket under the influence of the force exerted thereon during the printing operation and thereby reduce deformation of the blanket at the surface to obtain clear and beautiful printed letters, patterns, and the like. The compressed layer also is intended to absorb or damp the extra force exerted on a plate cylinder and the surface of the blanket (the extra force being exerted thereon in addition to normal printing force) when a printing paper is delivered in the folded state or two or more printing papers are incorrectly delivered in the superimposed state to a printing machine so that the running life of both the plate cylinder and the blanket is remarkably elongated. Thirdly, the compressible layer is further intended to assure that clear and beautiful printed letters and patterns can be obtained irrespective of skillfulness of an operator even when the cylinder arrangement is conducted to an apperciable excessive extent over the standard cylinder arrangement, although the regular blanket without any compressive layer employed therefor is required to carry out strict controlling operation with respect to its thickness so as to properly conduct the predetermined cylinder arrangement.

There have been already proposed a number of methods of producing a compressible layer of the above-mentioned type. One of them is a method of producing a compressible layer with a number of voids included therein by the steps of adding foaming agent to synthetic rubber and causing foaming phenomenon to take place by heating during vulcanization of the synthetic rubber (as disclosed in Japanese Patent Publication No. 3045/74). The other methods include the step of causing elastomer to mix into a porous felt (as disclosed in Japanese Patent Publication No. 131110/62) and the steps of dispersing a number of microcapsules into elastomer and producing a closed cell later (as disclosed in Japanese Patent Publication No. 7371/77).

As will be readily understood from the above description, it is required that a compressible layer utilized in a blanket for printing operation has the following functional characteristics:

1. Uniform absorption of the expansion caused on the surface of a blanket for printing operation.
2. Effective damping of the extra force exerted on the surface of the blanket.
3. Restorability of compression stress at a speed responsive to the working speed during the printing operation at a high speed.
4. Long durability.

Further, it is also required that a method of producing a compressible layer is adaptable to any variation, because the functional characteristics required for the blanket for printing operation vary in dependence on printing process employed and other factors.

Moreover, to meet the requirement with respect to the above-mentioned functional characteristics, a compressible layer is required to have compression stress in the range of 2.0 to 8.0 $Kg/cm^2$ in terms of compressibility (the compression stress is referred to under the working conditions of the compression speed of 1mm/min and the compression distance of 0.15 mm) and peeling strength 200 g/cm or higher (as measured in conformance with the standard peeling test), wherein the compression stress is selectively determined within the range of 2.0 to 8.0 $Kg/cm^2$.

However, it has been found that any of the conventional methods fails to produce a compressible layer having the compression stress lower than 4 $Kg/cm^2$; therefore, it fails to produce a compressible layer utilized in a blanket for printing operation having excellent compressibility.

SUMMARY OF THE INVENTION

Thus, the present invention has been made with the foregoing problems in mind.

It is a principal object of the present invention to provide an improved method of producing a compressible layer having compression stress in the range of 2.0 to 8.0 $Kg/cm^2$ in terms of compressibility and peeling strength 200 g/cm or higher and more particularly a method of producing a compressible layer having excellent compressibility, wherein the peeling strength is 200 g/cm or higher with the compression stress of lower than 4.0 $Kg/cm^2$.

It is another object of the present invention to provide an improved method of easily producing a compressible layer to be utilized in a blanket for printing operation which has the compression stress lower than 4.0 $Kg/cm^2$ in terms of compressibility and peeling strength 200 g/cm or higher.

It is another object of the present invention to provide an improved method of producing a compressible layer having various compressibility accomodating to various printing conditions.

It is a further another object of the present invention to provide an improved method of producing a blanket for printing operation having excellent functional characteristics with the above-mentioned compressible layer.

Other objects of the present invention will be more clearly apparent from the following description prepared with reference to the accompanying drawings.

To accomplish the above objects there is proposed according to one aspect of the invention a method of producing a compressible layer to be utilized for a blanket for printing operation. The method is carried out by way of the following steps:

(a) adding to elastomer compound of oil resistant polymer pulverized material having an average grain size in the range of 10 to 50 microns at a rate of 30 to 250 parts by weight relative to the elastomer compound of 100 parts by weight, the pulverized material being dissolvable in a certain effluent, (b) placing the elastomer compound with the pulverized material added thereto over a base fabric at a rate of coverage in the range of 100 to 1000 $g/m^2$ and subjecting to vulcanization so as to form a layered structure, and (c) immersing the layered structure in the effluent at a temperature ranging from room temperature to 100° for 3 minutes to 6 hours.

Further, there is proposed according to the other aspect of the invention a method of producing a compressible layer to be utilized for a blanket for printing operation, wherein the method is carried out by way of the following steps:

(a) adding to the elastomer compound of oil resistant polymer pulverized material having an average grain size in the range of 10 to 50 microns at a rate of 30 to 250 parts by weight relative to said rubber compound of 100 parts by weight, the pulverized material being dissolvable in a certain effluent, (b) placing the elastomer compound with the pulverized material added thereto over a base fabric at a rate of coverage in the range of 20 to 1000 g/m² and subjecting to vulcanization so as to form a layered structure, (c) immersing the layered structure in the effluent at a temperature ranging from room temperature to 100° C. for 3 minutes to 6 hours, and (d) placing one or more other compressive layers over the compressible layer so as to form an integrated layered structure.

Moreover, there is proposed according to another aspect of the invention a method of producing a compressible blanket for printing operation, wherein the method is carried out by way of the following steps:

(a) adding to the elastomer compound of oil resistant polymer pulverized material having an average grain size in the range of 10 to 50 microns at a rate of 30 to 250 parts by weight relative to said elastomer compound of 100 parts by weight, said pulverized material being dissolvable in a certain effluent, (b) placing the elastomer compound with the pulverized material added thereto over a base fabric at a rate of coverage in the range of 100 to 1000 g/m² and subjecting to vulcanization, so as to form a layered structure, (c) immersing the layered structure in the effluent at a temperature ranging from room temperature to 100° C. for 3 minutes to 6 hours, until a compressible layer is obtained, (d) coating the thus obtained compressible layer with an adhesive agent at a rate of coverage in the range of 50 to 700 g/m² in such a manner as to allow the adhesive agent to penetrate into the compressive layer, and (e) placing a reinforcing material over the compressible layer so as to adhesively integrate the former with the latter.

The method of the invention has an advantageous feature that a compressible layer having compression stress in the range of 2.0 to 8.0 Kg/cm² in terms of compressibility and peeling strength 200 g/cm or more and more particularly a compressible layer having excellent compressibility of which peeling strength is 200 g/cm or higher and of which compressing stress is lower than 4.0 Kg/cm² in terms of compressibility can be easily produced. In addition to this, the method of the invention has another advantageous feature that a blanket for printing operation having excellent functional characteristics with the above-mentioned compressible layer utilized therefor can be easily produced.

Other features and advantages of the invention will be also readily understood from the following description.

BRIEF DESCRIPTION OF THE DRAWINGS

The accompanying drawings will be briefly described below.

DETAILED DESCRIPTION OF THE INVENTION

Figure 1:
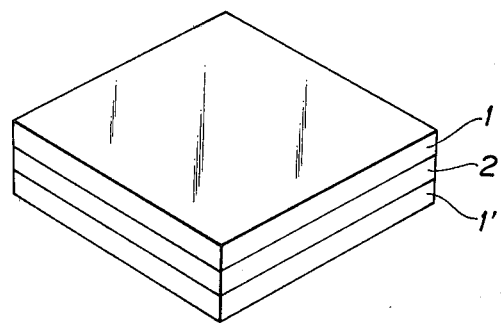
FIG. 1 is a perspective view of a compressible layer produced in accordance with the method of the present invention, schematically illustrating how it is constructed.

A method of producing a compressible layer to be utilized for a blanket for printing operation in accordance with the present invention is first initiated with the step of adding pulverized material, dissolvable in a certain effluent, to rubber compound of oil resistant polymer.

The rubber compound of oil resistant polymer serves as a main part constituting the compressible layer to be utilized for a blanket for printing operation. Therefore, the polymer is required to have chemical properties for constituting a compressible layer having a good resistibility against solvent which is used for processing printing ink, replacing it with another one or the like purpose. For the reason oil resistant polymer is employed for the elastomer compound. Specifically, one or a combination thereof selected from the group consisting of polyvinyl chloride, chloroprene rubber, nitrile rubber, polysulphide rubber, polyurethane, fluororubber, acrylic rubber, hydrine rubber or the like are employed as typical oil resistant polymer. Such an oil resistant polymer compound including elastomer as a main component may be added with one or a combination thereof selected from the group consisting of vulcanizing agent such as sulphur or the like material, vulcanization accelerating agent, reinforcement material such as carbon black or the like, aging prevention agent, procession aiding agent such as steric acid or the like.

The polymer compound is usually used by dissolving it in a certain solvent. Any solvent is basically employable when the polymer compound can be dissolved therein. For instance, one or a combination thereof selected from the group consisting of N-N'-dimethylformamide, diethylformamide, dimethylacetamide, dimethyl sulfoxide, toluene, methyl ethyl ketone, methyl isobutyl ketone or the like are employable as a solvent.

Any pulverized material is employable to be added to the polymer compound when it can be dissolved into a certain effluent. For instance, one or a combination thereof selected from the group consisting of inorganic salt such as sodium carbonate, sodium bicarbonate, sodium chloride, sodium nitrate, calcium nitrate or the like, water soluble organic material such as sugar, starch or the like and organic acid such as phenol, sulfosalicylic acid, tartaric acid or the like or its salt are available as a pulverized material.

Pulverized material has an average grain size in the range of 10 to 50 microns. When it has a grain size larger than 50 microns, excessively large voids are formed within the compressible layer and therefore, the latter fails to have sufficiently high peeling strength. On the other hand, when the pulverized material has a grain size smaller than 10 microns, it takes a long time until it is completely melted away into the effluent. Further, it is found that the pulverized material fails to be uniformly dispersed into the polymer compound and therefore, a compressible layer with a number of voids uniformly dispersed therein cannot be obtained.

An amount of addition of pulverized material is determined in the range of 30 to 250 parts by weight relative to the polymer compound of 100 parts by weight. When it is less than 30 parts by weight, it is found that the compressible layer has compression stress in excess of 8.0 kg/cm² in terms of compressibility. When it is more than 250 parts by weight, it has excessively reduced compression stress. In the last mentioned case, it results that the compressible layer has excessively high compressibility but has shortage in peeling strength. Accordingly, there is fear of causing a peeling phenomenon due to the shearing force while printing operation is performed with the compressible layer utilized for a blanket.

Basically, addition of the pulverized material to the polymer compound is not limited only to a certain process. For instance, open type mixing roll, internal mixer (including banbury mixer, pressurized kneader or the like) or the like apparatus can be employed for the purpose of addition of the pulverized material. When the polymer compound is prepared in a liquid state, the pulverized material can be uniformly dispersed thereinto by means of an agitating type mixer.

Next, the thus prepared polymer compound with the pulverized material added thereto is placed on a base fabric so as to form a layered structure and the latter is then subjected to vulcanization.

Basically, any base fabric may be employed for carrying out the method of the invention. For instance, fabric made of natural fiber such as cotton fabric or the like, fabric made of synthetic fiber such as rayon fabric, polyester fabric or the like and fabric made of inorganic fiber such as glass fiber or the like are employable.

Placing of polymer compound on a base fabric in the form of a layered structure is not limited only to a certain process. For instance, calendar rings may be employed for the purpose of forming a layered structure or an extruded film may be used for a base fabric. In case where the polymer compound is prepared in a liquid state, a layered structure can be formed by a coating operation with the aid of knife coater, roll coater or the like means.

A rate of coverage of polymer compound is determined in the range of 100 to 1000 g/m². When it is less than 100 g/m², a resultant compressible layer fails to function properly, whereas when it exceeds 1000 g/m², a blanket becomes too thick to be put in practical use for printing operation.

Placing of polymer compound on a base fabric is not limited only to a process where the placing is performed by a single operation. Alternatively, placing may be performed by a plurality of operations so as to form a required layered structure. Specifically, a layer of polymer compound is first formed on a base fabric and one or more layers of polymer compound which are same to the first mentioned one or different from the latter in composition are then formed on it one above another. After completion of vulcanization, a multi-layered compressible structure comprising a plurality of compressible layers is obtainable. In this case, it is obvious that the summation of coverage for each of the compressible layers reaches the aforesaid amount in the range of 100 to 1000 g/m². A rate of coverage of polymer compound per layer is selectively determined in dependence on physical properties of a product of layered structure, field of application of the latter and other conditions.

The thus obtained multi-layered structure has an advantageous feature that its compressibility can be easily controlled as required. For instance, a sandwiched type layered structure having long durability (owing to peeling strength higher than 200 g/cm) and the required compressibility as illustrated in FIG. 1 can be easily manufactured, wherein a compressible layer 2 having higher compression stress is sandwiched between both the upper and lower compressible layers 1 and 1' having lower compressive stress.

Next, the thus prepared compressible layer is limited in a certain effluent.

Basically, any effluent is employable when pulverized material is dissolvable therein. For instance, one or a combination thereof selected from the group consisting of monool such as methanol, ethanol or the like, polyol such as glycerol, ethylene glycol or the like, water and others are employable.

During the step of immersion a temperature of effluent is determined in the range of room temperature to 100° C. When it is lower than room temperature, it takes a long time until the pulverized material is completely melted away in the effluent, whereas when it is higher than 100° C., there is fear of causing a part of rubber compound to be melted away therein, resulting in reduced durability of a product of layered structure.

Further, the immersion time is determined in the range of 3 minutes to 6 hours. When it is shorter than 3 minutes, pulverized material fails to be sufficiently melted away in effluent, whereas it is longer than 6 hours, there is fear that physical properties of a base fabric vary while a part of rubber compound is melted away in effluent.

Figure 2:
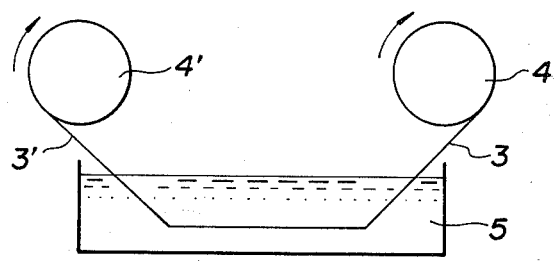
FIG. 2 is a schematic vertical sectional view illustrating how immersion of the layered structure in a certain effluent is carried out.

Preferably, the layered structure is immersed in the effluent under the influence of tension applied thereto. FIG. 2 schematically illustrates an example of immersion process in which a layered structure is immersed in the effluent under tension applied thereto in the longitudinal direction. Specifically, the right-hand end part of a layered structure 3 is secured to a roll 4 while the left-hand end part of a layered structure 3' is secured to a roll 4'. The layered structure is immersed in effluent 5 under the influence of tension which is applied thereto by rotating both the rolls 4 and 4' in the opposite direction to one another. Tension to be applied to the layered structure is preferably determined in the range of 10 to 100 kg/m in width. When it is less than 10 kg/m in width, no functional effect is achieved in spite of application of tension, whereas when it is more than 100 kg/m in width, there is fear of reducing strength of a base fabric. By immersing the layered structure in effluent under the influence of tension, the pulverized material is acceleratedly melted away therein.

The thus prepared compressible layer is coated with an adhesive agent so that a reinforcement fabric is placed over the coated layer. Thereafter, a layer of surface elastomer is formed on the resultant layered structure. As a result, a required blanket for printing operation is obtained.

When a method according to another aspect of the present invention is employed, it is carried out by way of the steps of placing polymer compound with pulverized material added thereto on a base fabric so as to form a layered structure, immersing the layered structure in the effluent until the pulverized material is completely melted away in the latter and thereby a required compressible layer with a number of voids included therein is obtained, and then placing another compressible layer over the first mentioned compressible layer. By placing the compressible layers one above another, it is assured that the whole compressible layered structure (hereafter referred to as a multi-layered compressible layer) will have peeling strength and compressibility both of which are controlled properly.

In this method of the invention, oil resistant polymer compound pulverized material to be added thereto, amount of pulverized material to be added, rate of coverage of polymer compound with pulverized material added thereto on a base fabric, kind of base fabric, kind of effluent, working conditions for the step of immersion, manner for conducting the step of immersion and others are substantially the same to those in the method according to the first mentioned aspect of the present invention, and their repeated description is omitted.

Since in the method according to the second aspect of the invention another compressible layer is additionally placed on an early prepared compressible layer previously formed on the base fabric as described above, a thickness of each of the compressible layers is preferably dimensioned less than that in the method according to the first aspect of the invention. For the reason a rate of coverage of polymer compound on a base fabric is preferably determined in the range of 20 to 500 g/m² in total. When the polymer compound is placed on a base fabric at a rate of coverage more than 500 g/m² and the layered structure is immersed in the effluent so as to form the first compressible layer, there is fear that the whole compressible layered structure (multi-layered compressible layer) comprising the second compressible layer, the third compressible layer and so forth will have an excessively heavy thickness. On the other hand, when it is less than 20 g/m², a resultant blanket fails to function properly.

Placing of polymer compound on a base fabric may be conducted either by a single operation in the same manner as in the first aspect of the invention or by a plurality of operations.

One or a combination of compressible layers selected from the group consisting of the second compressible layer, the third compressible layer and so forth are placed on the first compressible layer as prepared in the above-described manner. Any of additional compressible layers may be a compressible which has been manufactured by the method according to the first aspect of the invention. Alternatively, the method according to the second aspect of the invention may be carried out by way of the steps of placing polymer compound on a detachable base material in the form of a layered structure, subjecting the layered structure to vulcanization, immersing it in effluent until a compressible layer is formed, integrating one compressible layer with another one with the aid of an adhesive agent and then peeling off the detachable base material from the integrated structure so that a required compressible layered structure is obtained.

Further, any of the conventional compressible layers such as compressible layer with a number of voids included therein which are formed by means of foaming agent (as disclosed in Japanese Patent Publication No. 3045/74), compressible layer with a number of independent voids included therein which are formed by means of microcapsules mixed in rubber compound (as disclosed in Japanese Patent Publication No. 7371/77), compressible layer with elastomer impregnated into porous felt (as disclosed in Japanese Patent Publication No. 13110/61), compressible layer with a number of grooves formed crosswise on elastomeric base material (as disclosed in Japanese Patent Publication No. 766/68), and compressible layer with pulverized material of colk, wood, fiber or the like included in elastomeric base material (as disclosed in Japanese Patent Publication No. 3045/74) may be used as an additional compressible layer to be placed on an early prepared compressible layer. Further, a compressible layer which is manufactured by removing solvent from liquidized elastic polymer (as disclosed in Japanese Patent Publication No. 3,045/74) may be used for the same purpose.

The thickness of the multi-layered compressible layer manufactured according to the second aspect of the invention is dimensioned substantially equal to that of a compressible layer including a layered structure of polymer compound produced to the first aspect of the invention, that is, a compressible layer with polymer compound placed at a rate of coverage in the range of 100 to 1000 g/m².

Next, the thus prepared multi-layered compressible layer is coated with adhesive agent and a reinforcement fabric is placed on the coated structure. Thereafter, a layer of surface rubber is additionally formed on the reinforcement fabric and thereby a required blanket for printing operation is obtained.

Further, to increase compression stress in the compressible layer produced by way of the above-described steps, that is, to assure that compressibility is controlled as required, there is also proposed according to other aspects of the invention a method of manufacturing a compressible blanket for printing operation, wherein a reinforcement member is adhesively secured to a single or multi-layered compressible layer by applying adhesive agent at a rate of coverage in the range of 50 to 700 g/m². This is intended to improve the compression stress by filling a part of voids in the compressible layer with adhesive agent penetrated thereinto, when it is found that the compressible layer manufactured according to the first and second aspects of the invention has excessively low compression stress, for instance, less than 2 kg/cm² in terms of compressibility. Thus, by carrying out the method of the invention in the above-described manner, it is assured that a required blanket for printing operation is easily manufactured with a compressible layer utilized therefor which has peeling strength 200 g/cm or higher and compression stress in the range of 2.0 to 8.0 Kg/cm² in terms of compressibility.

In this case a rate of coverage of adhesive agent is determined in the range of 50 to 700 g/m². When a rate of coverage is less than 50 g/m², the adhesive agent penetrates into the compressible layer insufficiently and therefore compressibility to be controlled properly. On the other hand, when it is in excess of 700 g/m², almost all of the voids are filled with adhesive agent penetrated thereinto, and moreover an extra amount of adhesive layer forms a thick layer so that a blanket will have an excessively heavy thickness.

Viscosity of adhesive agent is preferably determined in the range of 5 to 100 in terms of Mooney viscosity $ML_{1+4}$, at a temperature of 100° C. When it is less than 5, the adhesive agent is very easy to penetrate into voids in the compressible layer and therefore it is difficult to control an amount of penetration of adhesive agent. On the other hand, when it is in excess of 100, the adhesive agent penetrates into voids in the compressible layer insufficiently.

After the compressible layer is coated with adhesive agent in the above-described manner, it is caused to penetrate into voids in the compressible layer with the aid of rolls which serve to impart rolling force thereto. Rolling force for facilitating the penetration of adhesive agent is preferably determined in the range of 40 to 400 Kg/cm in width in terms of line pressure. When it is less than 40 Kg/cm in width, it takes a long time until adhesive agent penetrates as required, whereas when it is in excess of 400 Kg/cm in width, there is fear of causing damage or injury of the base fabric or causing adhesive agent to exude from the coated structure.

Basically, a reinforcement member to be adhesively integrated with the compressible layer is not limited only to a certain material. For instance, fabric made of natural fiber such as cotton fabric, fabric made of synthetic fiber such as layon fabric, polyester fabric or the like or fabric made of inorganic fiber such as glass fiber or the like are employable as a preferable reinforcement member. Further, a layer of surface rubber is integrally formed on the reinforcement fabric. As a result, a required blanket for printing operation is obtained.

Next, the present invention will be described in more details hereunder with respect to several typical examples, but it should be noted they are merely illustrative, and the invention should not be limited only to them.

EXAMPLE 1

Nitrile elastomer compound of 100 parts by weight previously well kneaded in accordance with a conventional process was added with surface active agent of 2 parts by weight and salt (NaCl) of 50 parts by weight with the aid of mixing rolls until they were uniformly dispersed into the rubber compound and the thus prepared mixture was then placed in the form of a dopping layer over a cotton fabric at a rate of coverage of 300 g/m$^2$ with the aid of rubber calendar rolls, said cotton fabric being previously coated with rubber based adhesive agent.

After completion of vulcanization in a drum, the layered structure was immersed in the water at a temperature of 80° C. for 4 hours so as to remove salt therefrom by dissolution. After it was dried, a reinforcement fabric and a surface rubber layer were placed on the layered structure one above another, and thereby a required printing blanket was obtained. It was found that the thus obtained printing blanket had a compression stress of 7.5 Kg/cm$^2$.

EXAMPLE 2

Nitrile elastomer compound previously well kneaded in accordance with a conventional process was dissolved with toluene, and the rubber compound solution was then added with surface active agent of 2 parts by weight and salt of 150 parts by weight having an average grain size of 20 microns relative to the elastomer compound of 100 parts by weight while the mixture was stirred sufficiently so as to allow the additions to be uniformly dispersed in the rubber compound.

The thus obtained mixture was coated over a cotton fabric at a rate of coverage of 600 g/m$^2$ with the aid of a knife coater or the like tool, and the coated structure was then dried so as to remove the solvent therefrom. After it was subjected to vulcanizing, it was immersed in the water at a temperature of 80° C. for 4 hours.

The thus obtained coated structure was then treated in the same manner as in the preceding example so as to obtain a required printing blanket. It was found that this blanket had a compression stress of 2.5 Kg/cm$^2$.

EXAMPLE 3

In this example a printing blanket was manufactured in accordance with the processes employed in the above Examples 1 and 2 with the exception that an amount of salt to be added varies. Compression stress on a printing blanket manufactured in the Example 3 and compression stress on a printing blanket manufactured in accordance with the conventional processes are shown in Table 1.

TABLE 1

| Type of printing blanket | Amount of salt added | Compression stress |
|---|---|---|
| Printing blanket manufactured in accordance with the method of the invention (see Example 1) | 50 parts by weight | 7.5 Kg/cm$^2$ |
| Printing blanket manufactured in accordance with the method of the invention (see Example 1) | 70 parts by weight | 6.0 Kg/cm$^2$ |
| Printing blanket manufactured in accordance with the method of the invention (see Example 1) | 110 parts by weight | 4.7 Kg/cm$^2$ |
| Printing blanket manufactured in accordance with the method of the invention (see Example 2) | 150 parts by weight | 2.5 Kg/cm$^2$ |
| Printing blanket manufactured in accordance with the conventional method with foaming agent used therefor | — | 4.0 to 6.5 Kg/cm$^2$ |
| Printing blanket manufactured in accordance with the conventional method with a number of fine hollow balls used therefor | — | 4.5 to 8.0 Kg/cm$^2$ |
| Printing blanket manufactured in accordance with the conventional method with porous felt used therefor | — | 5.5 to 7.0 Kg/cm$^2$ |

EXAMPLE 4

Nitrile elastomer compound previously well kneaded in accordance with a conventional process was dissolved with toluene. Then, a part of the rubber compound solution was added with surface active agent of 2 parts by weight and salt of 100 parts by weight having an average grain size of 20 microns relative to the rubber compound of 100 parts by weight and the residual part of the same was added with surface active agent of 2 parts by weight and salt of 150 parts by weight having an average grain size of 20 microns relative to the rubber compound of 100 parts by weight. Each of the above-mentioned parts was stirred sufficiently until the additions were uniformly dispersed in the rubber compound solution. The first mentioned part of elastomer compound solution with salt of 100 parts by weight added thereto was first coated over a cotton fabric at a rate of coverage of about 250 g/m$^2$ with the aid of a knife coater or the like tool, and the coated structure was dried so as to remove the solvent therefrom. Next, the last mentioned part of elastomer compound solution with salt of 150 parts by weight added thereto was coated over the early coated structure at a rate of coverage of about 200 g/m$^2$ in the same manner as in the foregoing and the double coated structure was dried so as to remove the solvent therefrom. After completion of vulcanization the double coated structure was immersed in the water at a temperature of 80° C. for 4 hours so as to remove the salt therefrom by dissolution.

Next, the first mentioned part of elastomer compound solution with salt of 100 parts by weight added thereto was coated over a cotton fabric at a rate of coverage of about 250 g/m² in the same manner as in the foregoing, and the coated structure was dried so as to remove the solvent therefrom. After completion of vulcanization, salt was removed by dissolution. Then, two coated structures were integrated in the form of a layer with an adhesive agent interposed therebetween, and a reinforcing fabric and a surface elastomer layer were additionally integrated with the early integrated coated structure. Thus, a required printing blanket was obtained. It was found that the thus obtained printing blanket had a compression stress of 2.5 Kg/cm².

EXAMPLE 5

Nitrile rubber compound previously well kneaded in accordance with a conventional process was dissolved with toluene, and the obtained elastomer compound solution was then added with surface active agent of 2 parts by weight and salt of 150 parts by weight having an average grain size of 20 microns relative to the elastomer compound of 100 parts by weight while the mixture was stirred sufficiently so as to allow the additions to be uniformly dispersed in the elastomer compound solution. The thus obtained mixture was coated over a cotton fabric at a rate of 600 g/m² with the aid of a knife coater or the like tool and the coated structure was then dried to remove solvent therefrom. After completion of vulcanization it was immersed in the water at a temperature of 80° C. for 4 hours so as to remove the salt by dissolution. After it was dried, it was coated with an adhesive agent having a Mooney viscosity of 40 to 50 at a rate of coverage of about 40 g/m². On the other hand, a base fabric to be adhesively integrated with the aforesaid coated structure was coated with the same adhesive agent at a rate of coverage of about 160 g/m² and thereafter both the coated structures were integrated with one another with the adhesive agent located therebetween. The thus integrated coated structure was subjected to compression under the working conditions of line pressure of 150 Kg/cm in width and moving speed of 8 m/min and thereafter a reinforcing fabric and a surface rubber layer were additionally integrated with the early integrated coated structure in the form of a layer. Thus, a required compressible printing blanket was obtained. It was found that the thus obtained printing blanket had a compression stress of 2.5 Kg/cm².

EXAMPLE 6

Substantially the same coated structures as those in the preceding Example 5 were subjected to compression under the working conditions of line pressure of 250 Kg/cm in width and moving speed of 8 m/min, and the thus obtained integrated structure was further treated in the same manner as in the Example 5. Thus, a required compressible printing blanket was obtained. It was found that the thus obtained printing blanket had a compression stress of 4.8 Kg/cm².

While the present invention is described above with respect to six typical examples, it should be of course understood that the invention should not be limited only to them, various changes or modifications may be made in a suitable manner without any departure from the spirit and scope of the invention.

We claim:

1. A method of producing a compressible layer to be utilized for a blanket for printing operation having compression stress in the range of 2.0 to 8.0 kg/cm² in terms of compressibility and peeling strength of 200 g/m or more, characterized in that said method comprises the following steps:
    adding to elastomer compound of oil resistant polymer pulverized material having an average grain size in the range of 10 to 50 microns at a rate of 30 to 250 parts by weight relative to said elastomer compound of 100 parts by weight, said pulverized material being dissolvable in a certain effluent;
    placing the elastomer compound with the pulverized material added thereto over a base fabric at a rate of coverage in the range of 100 to 1000 g/m² and subjecting to vulcanization so as to form a layered structure; and
    immersing the layered structure in the effluent at a temperature ranging from room temperature to 100° C. for 3 minutes to 6 hours.

2. A method as defined in claim 1, characterized in that the oil resistant polymer constituting the elastomer compound comprises one or a combination thereof selected from the group consisting of polyvinyl chloride, chloroprene rubber, nitrile rubber, polysulfide rubber, polyurethane, fluororubber, acrylic rubber and hydrine rubber.

3. A method as defined in claim 1, characterized in that the pulverized material comprises one or a combination thereof selected from the group consisting of inorganic salt such as soldium carbonate, sodium bicarbonate, sodium chloride, sodium nitrate, calcium nitrate or the like, watersoluble organic material such as sugar, starch or the like and organic acid such as phenol, sulfosalicylic acid, tartaric acid or the like or its salt.

4. A method as defined in claim 1, characterized in that the base fabric comprises a fabric made of natural fiber, synthetic fiber or inorganic fiber.

5. A method as defined in claim 1, characterized in that the layered structure of polymer compound on the base fabric comprises a plurality of layers each of which is formed one above another.

6. A method as defined in claim 5, characterized in that the amount of coverage of the polymer compound for each of the layers is determined in the range of 20 to 500 g/m².

7. A method as defined in claim 1, characterized in that the immersion of the layered structure in the effluent is performed under the influence of tension imparted thereto.

8. A method as defined in claim 7, characterized in that the tension to be imparted to the layered structure is determined in the range of 10 to 100 kg/m in width.

9. A method as defined in claim 1, characterized in that the effluent comprises one or a combination thereof selected from the group consisting of methanol, ethanol, glycerol, ethylene glycol and water.

10. A method of producing a compressible layer to be utilized for a blanket for printing operation having compression stress in the range of 2.0 to 8.0 kg/cm² in terms of compressibility and peeling strength comprises 200 g/cm or more, characterized in that said method comprises the following steps:
    adding to elastomer compound of oil resistant polymer pulverized material having an average grain size in the range of 10 to 50 microns at a rate of 30 to 250 parts by weight relative to said elastomer compound of 100 parts by weight, said pulverized material being dissolvable in a certain effluent;

placing the elastomer compound with the pulverized material added thereto over a base fabric at a rate of coverage in the range of 20 to 1000 g/m² and subjecting to vulcanization so as to form a layered structure;

immersing the layered structure in the effluent at a temperature ranging from room temperature to 100° C. for 3 3 minutes to 6 hours until a required compressible layered structure is obtained; and placing one or more another compressible layers over said compressible layer so as to form an integrated layered structure.

11. A method as defined in claim 10, characterized in that the oil resistant polymer constituting the elastomer compound comprises one or a combination thereof selected from the group consisting of polyvinyl choloride, chloroprene rubber, nitrile rubber, polysulfide rubber, polyurethane, fluororubber, acrylic rubber and hydrine rubber.

12. A method as defined in claim 10, characterized in that the pulverized material comprises one or a combination thereof selected from the group consisting of salt such as sodium carbonate, sodium bicarbonate, sodium chloride, sodium nitrate, calcium nitrate or the like, water-soluble organic material such as sugar, starch or the like and organic acid such as phenol, sulfosalicylic acid, tartaric acid or the like or its salt.

13. A method as defined in claim 10, characterized in that the base fabric comprises a fabric made of natural fiber, synthetic fiber or inorganic fiber.

14. A method as defined in claim 10, characterized in that the layered structure of polymer compound on the base fabric comprises a plurality of layers each of which is formed one above another.

15. A method as defined in claim 14, characterized in that the amount of coverage of the polymer compound for each of the layers is determined in the range of 20 to 500 g/m².

16. A method as defined in claim 10, characterized in that the immersion of the layered structure in the effluent is performed under the influence of tension imparted thereto.

17. A method as defined in claim 16, characterized in that the tension to be imparted to the layered structure is determined in the range of 10 to 100 Kg/m in width.

18. A method as defined in claim 10, characterized in that the effluent comprises one or a combination thereof selected from the group consisting of methanol, ethanol, glycerol, ethylene glycol and water.

19. A method of producing a compressible blanket for printing operation having compression stress in the range of 2.0 to 8.0 Kg/cm² in terms of compressibility and peeling strength 200 g/cm or more, characterized in that said method comprises the following steps:

adding to the elastomer compound of oil resistant polymer pulverized material having an average grain size in the range of 10 to 50 microns at a rate of 30 to 250 parts by weight relative to said elastomer compound of 100 parts by weight, placing the elastomer compound with the pulverized material added thereto over a base fabric at a rate of coverage in the range of 100 to 1000 g/m² and subjecting to vulcanization so as to form a layered structure, immersing the layered structure in the effluent at a temperature ranging from room temperature to 100° C. for 3 minutes to 6 hours until a required compressible layer is obtained, coating the thus obtained compressible layer with an adhesive agent at a rate of coverage in the range of 50 to 700 g/m² in such a manner as to allow said adhesive agent to penetrate into the compressible layer; and placing a reinforcing material over the compressible layer so as to adhesively integrate the former with the latter.

20. A method as defined in claim 19, characterized in that the oil resistant polymer constituting the rubber compound comprises one or a combination thereof selected from the group consisting of polyvinyl chloride, chloroprene rubber, nitrile rubber, polysulfide rubber, polyurethane, fluororubber, acrylic rubber and hydrine rubber.

21. A method as defined in claim 19, characterized in that the pulverized material comprises one or a combination thereof selected from the group consisting of inorganic salt such as sodium carbonate, sodium bicarbonate, sodium chloride, sodium nitrate, calcium nitrate or the like, water-soluble organic material such as sugar, starch or the like and organic acid such as phenol, sulfosalicylic acid, tartaric acid or the like or its salt.

22. A method as defined in claim 19, characterized in that the base fabric comprises a fabric made of natural fiber, synthetic fiber or inorganic fiber.

23. A method as defined in claim 19, characterized in that the layered structure of polymer compound on the base fabric comprises a plurality of layers each of layers each of which is formed one above another.

24. A method as defined in claim 23, characterized in that the amount of coverage of the polymer compound for each of the layers is determined in the range of 20 to 500 g/m².

25. A method as defined in claim 19, characterized in that the immersion of the layered structure in the effluent is carried out under the influence of tension imparted thereto.

26. A method as defined in claim 25, characterized in that the tension to be imparted to the layered structure is determined in the range of 10 to 100 Kg/m in width.

27. A method as defined in claim 19, characterized in that the effluent comprises one or a combination thereof selected from the group consisting of methanol, ethanol, gylcerol, ethylene glycol and water.

28. A method as defined in claim 19, characterized in that the viscosity of the adhesive agent is determined in the range of 5 to 100 in terms of Mooney viscosity ML1 to 4'.

29. A method as defined in claim 19, characterized in that the reinforcement material comprises a fabric made of natural fiber, synthetic fiber or inorganic fiber.

30. A method as defined in claim 19, characterized in that coating of the adhesive agent is carried out under application of force in terms of line pressure in the range of 40 to 400 Kg/cm in width.

* * * * *